Figure 5:
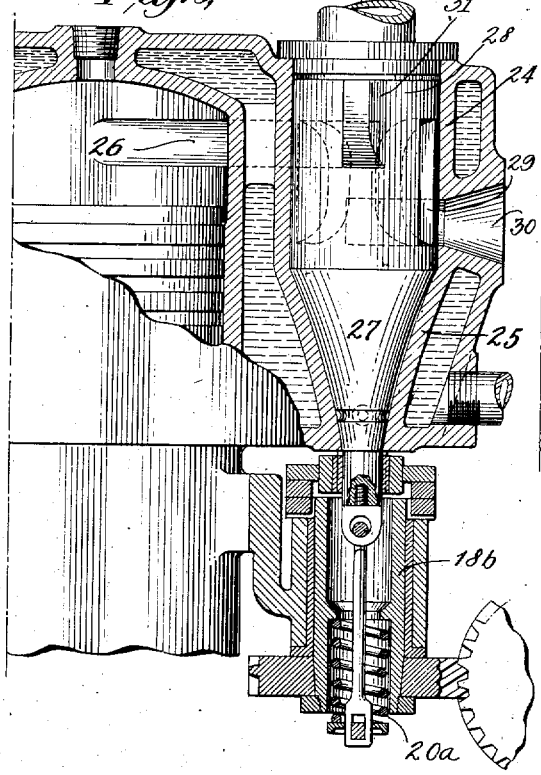

J. GOOD.
INTERNAL COMBUSTION ENGINE VALVE.
APPLICATION FILED FEB. 27, 1922.
Reissued June 13, 1922.
15,382.
3 SHEETS—SHEET 1.
Fig. 1,
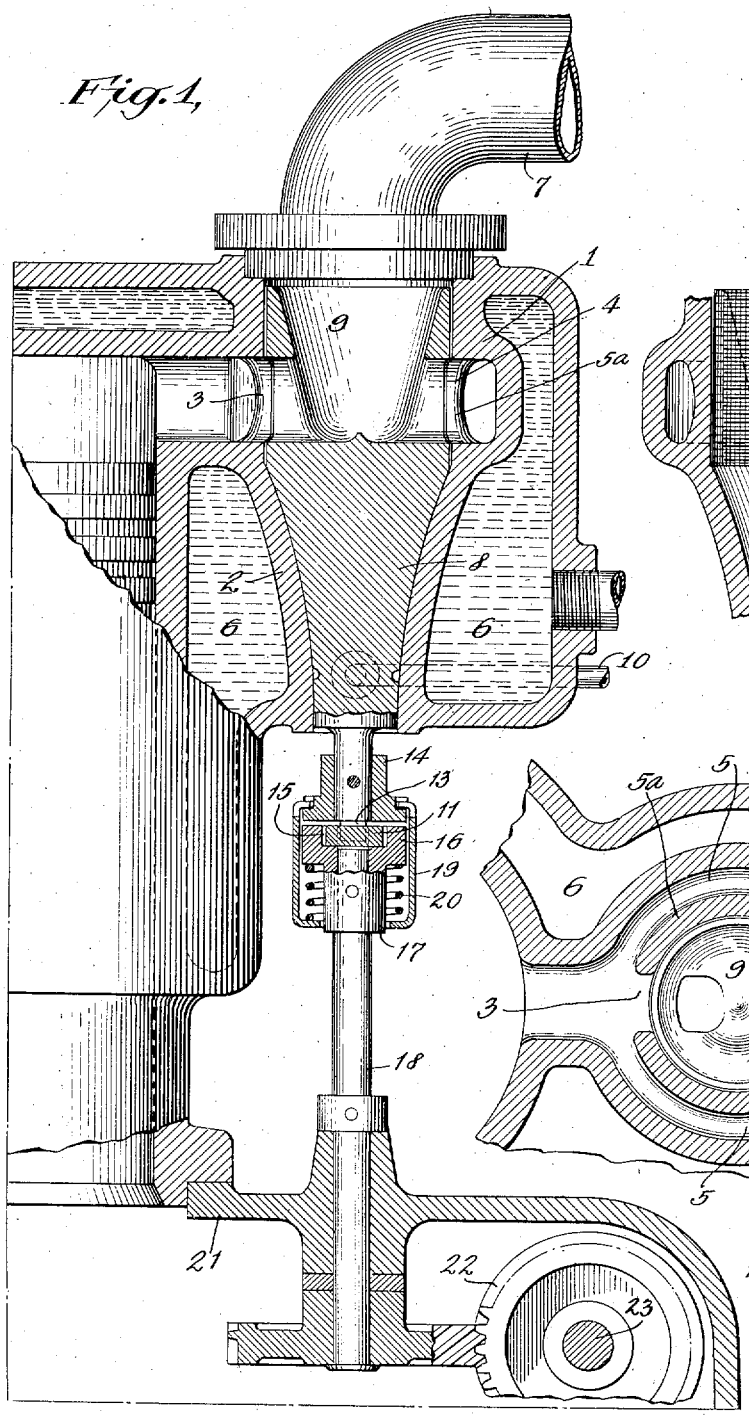
Fig. 2,
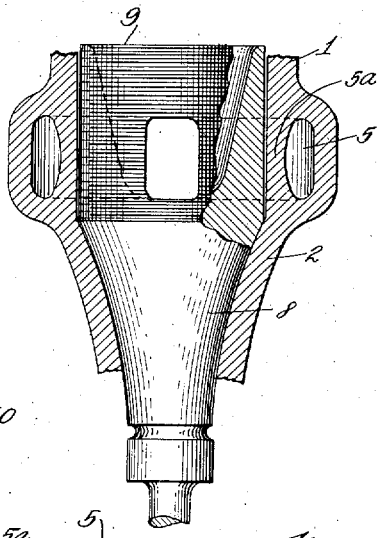
Fig. 3,
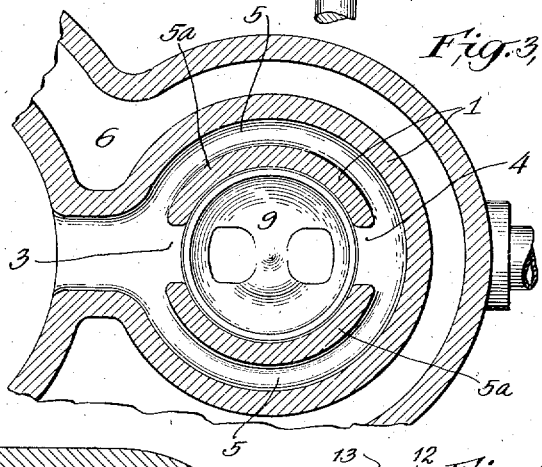
Fig. 4,
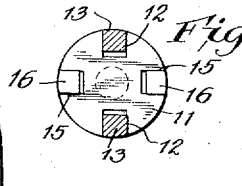
INVENTOR
John Good
BY
Jeffery, Kimball & Eggleston
ATTORNEYS

J. GOOD.

INTERNAL COMBUSTION ENGINE VALVE.

APPLICATION FILED FEB. 27, 1922.

Reissued June 13, 1922.

15,382.

3 SHEETS—SHEET 2.

INVENTOR

BY John Good

Jeffery, Knudsen & Eggleston

ATTORNEYS

J. GOOD.
INTERNAL COMBUSTION ENGINE VALVE.
APPLICATION FILED FEB. 27, 1922.
Reissued June 13, 1922.
15,382.
3 SHEETS—SHEET 3.
Fig. 9,
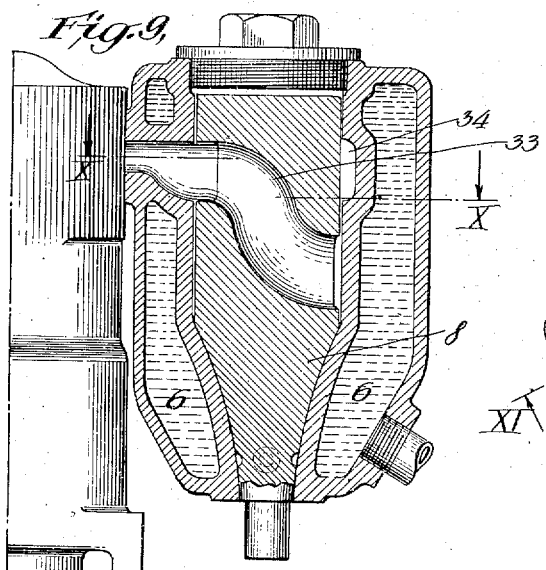
Fig. 10,
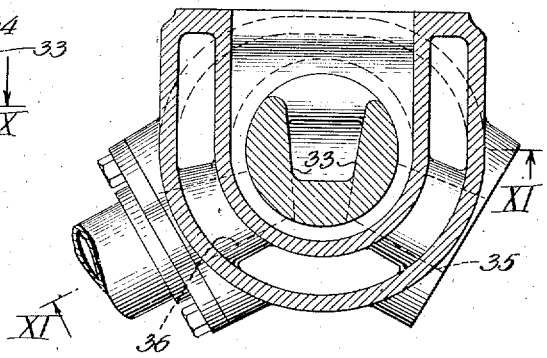
Fig. 11,
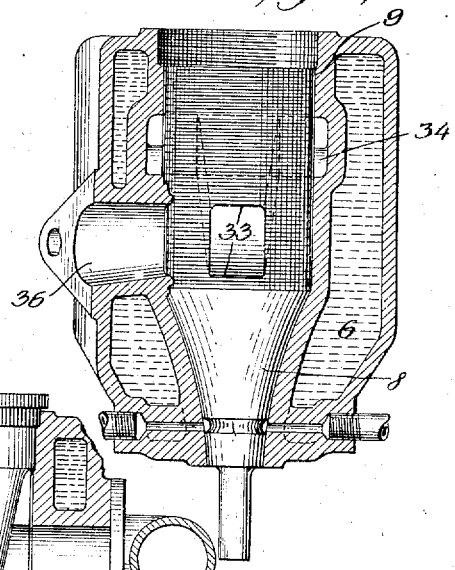
Fig. 12,
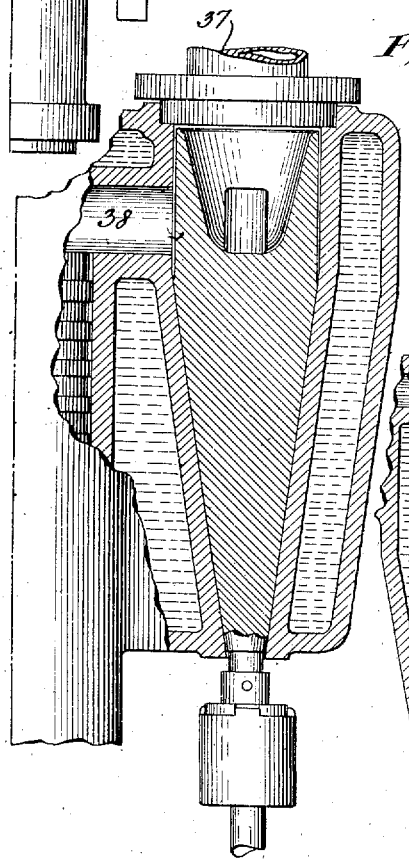
Fig. 13,
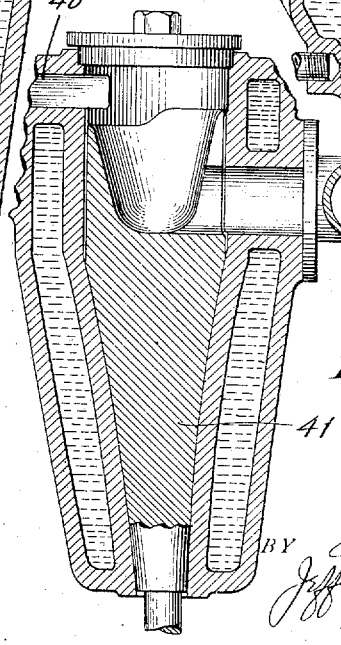
INVENTOR
John Good
BY
Jeffery, Kimball & Eggleston
ATTORNEYS

UNITED STATES PATENT OFFICE.

JOHN GOOD, OF GARDEN CITY, NEW YORK, ASSIGNOR TO GOOD INVENTIONS CO., OF BROOKLYN, NEW YORK, A CORPORATION OF NEW YORK.

INTERNAL-COMBUSTION-ENGINE VALVE.

15,382. Specification of Reissued Letters Patent. Reissued June 13, 1922.

Original No. 1,230,291, dated June 19, 1917, Serial No. 74,553, filed January 27, 1916. Application for reissue filed February 27, 1922. Serial No. 539,776.

*To all whom it may concern:*

Be it known that I, JOHN GOOD, a citizen of the United States, residing in Garden City, county of Nassau, and State of New York, have invented the following described Improvements in Internal-Combustion-Engine Valves.

The invention consists in a special relation of valve member and valve casing for internal combustion engines and provides a valve of simple and durable form, capable of service for the full life of the engine on which used, and with a maximum of mechanical and thermal efficiency and without requiring any particular attention to maintain it in such condition. The invention eliminates objections inherent in the ordinary puppet valve and slide and sleeve valves and also overcomes the principal obstacles to the successful and practical operation of rotary engine-valves in general. The puppet valve, although in universal use in combustion engines, falls short of perfection for such purpose. Its necessary reciprocating motion gives rise to numerous familiar troubles, particularly in large sizes or even in small size when operated at high speeds, and its dependence on cams and springs gives rise to further troubles requiring care and attention. The fact that it is exposed to flame temperatures and is not readily cooled, especially the exhaust, renders it subject to warping as the result of heat and to erosion by the hot gases and to early leakage from these causes, requiring further attention and cost. Puppet valves for exhaust open against the pressure in the engine and consequently they consume energy in excess of that required merely to accomplish their reciprocation, and the high temperatures not only deteriorate the metal of which they are made but also promote premature ignition of the fuel charge. All these deficiencies and others including vibration due to high speed reciprocation in automobile, aero and boat engines, and rapid seat wear in Diesel engines, especially when large, due to high pressures and large disk areas, are familiar to the art and need not be further explained. The reciprocating sleeve valve engine, of recent development, has succeeded in eliminating many of the objections to the puppet and may be fairly regarded as the only actual improvement thereon, but it is complicated in its timing means, and increases rather than avoids the difficulties of balance due to reciprocation, and it is not at all adapted to large cylinders. It is also heavy and very expensive to make and maintain in condition, and it is quite dependent upon special and elaborate lubricating facilities, besides having the special further objection that carbonized lubricant builds up in the valve port and clogs the passage. The same criticisms apply also to other sliding type valves, whether of the sleeve or piston form, and are well known to gas engine engineers. While rotary valves, of the various types so far proposed, naturally eliminate the difficulties due solely to reciprocating motion, it is a fact that they all involve other objections of even greater consequence, the principal objection being early leakage as the result of wear, and not to be avoided by usual means or remedied in any practicable manner once it has occured. Consequently, rotary valves in all the forms so far proposed, though theoretically perfect in their initial condition and operation, do not last the life of the rest of the engine and are very soon useless to retain compression. The principal reason for such rapid decline of efficiency is the severity of the temperatures involved in the engine process and the inability of the rotary member of the valve to get rid of heat fast enough, and which in consequence, causes excessive thermal expansion and warping, destruction of lubrication and the fit of the valve on its seat, and these, in turn, result in immediate scoring and deterioration of both member and seat so that they no longer constitute a port-sealing agent. It will be appreciated of course that the effect of such high temperatures on the lubrication is first to reduce its viscosity permitting it to escape, and second, to burn up any residue. Lubrication of the rotary member is a primary factor in guarding against excessive temperature because the film of oil between the moving and stationary seat-surfaces has the effect of virtually uniting them and providing what practically amounts to a continuously solid metallic heat-conducting path from the rotary member through the stationary seat to the exterior air or water jacket. Metal is the best conductor of heat, and the oil film, though thin, bridges the gap or crevice between the sliding metal surfaces without itself interposing any appreciable obstruction, but if it be interrupted, the sliding surfaces then become separated by a thin film of gas, which, on the contrary, is a most effective barrier to heat conduction and holds the heat back in the rotary member instead of discharging it to the water-cooled seat, and the excessive temperature referred to then immediately follows. The integrity of the oil film is thus the essential condition of its own existence and of the useful life of the valve, but none of the rotary valves of the prior art have possessed the ability to maintain satisfactory oil films on their seats, even though there have been many attempts to accomplish that result by systems of internally cooling the rotary member and other means, and certainly no rotary valved engine has yet appeared in which the valve could equal the life of the other engine parts. And even where the film has been established and maintained for a period, the valve has had the objection of clogging of its ports by accretions of hard carbonized lubricant therein, this being a serious objection quite independent of whether the temperature of the valve is maintained low or high.

The present invention is a rotary valve but eliminates the foregoing and other objections peculiar to that class by dividing the functions of the valve structure so that the parts which seal the port serve that function only and have no function of sustaining wear or preserving heat-transferring contact, and the seating parts which support the rotary valve member and are subject to wear, provide such contact, for escape of heat, but have no port-sealing function whatever. The surfaces of the port-sealing parts are in very close, but not in actual rubbing contact with each other, and are not pressed together, so that they are not subject to frictional wear and may thus run dry without lubrication, their port sealing action being obtained by the resistance to flow offered by such narrow crevice promoted by the relative motion of one wall over the other. The seating surfaces, constituted by a journal surface on the rotary member and a journal seat on the valve casing maintain the said dry-running surfaces in their intended non-frictional relation and these seating surfaces are so related that the effect of wear thereon does not disturb or affect the port-sealing function and they are lubricated and of sufficient area of film-connected surface to conduct heat away from the dry-running part of the rotary member so fast that the temperature rises very little and thereby, the said part which is exposed to the flame is kept at all times at a safely low temperature and is therefore free from all the consequences of excessive temperature, and moreover, because it is not pressed to the casing or lubricated, its port passages can not clog with carbonized oil, while wear, as stated, is ineffective on the tightness of the closure. To provide the adequate heat-transfer path from the dry running part of the rotary member to the exterior cooling medium, the said member is purposely made of relatively massive and solid metal construction, especially at its journal portion to provide a large metallic cross-section and the oil film, which forms the heat-transferring connection from it to the cooled seat is kept intact by one or all of the several effective means for that purpose, that is to say, first by distributing the pressure symmetrically with reference to the axis of rotation so that wear will be substantially uniform, second, by relieving or partially balancing such pressure to reduce the symmetrical wear to a minimum, and also, and preferably, by taper-curving the seat surface, as described below, to bring about a special relation of pressure and surface velocity which is most conducive to the permanent film-form condition in the presence of heat. These means accomplish the permanent cooling of the entire mass of metal of the rotary member, and a constant, proper lubrication, and hence establish a permanent condition of efficiency notwithstanding wear, all as hereinbelow fully explained, in connection with the drawings wherein—

Figure 1 is an axial section, taken through the axis of rotation of one form of the improved valve, indicating also a portion of the internal combustion engine cylinder and valve gearing.

Figure 6:
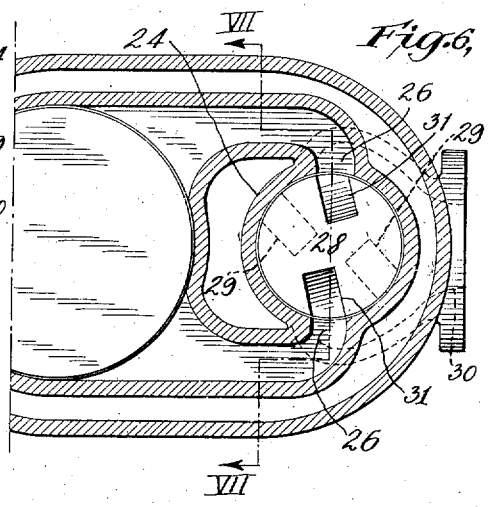
Figure 8:
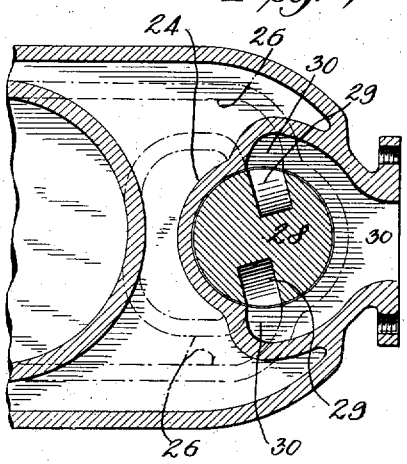
Figure 7:
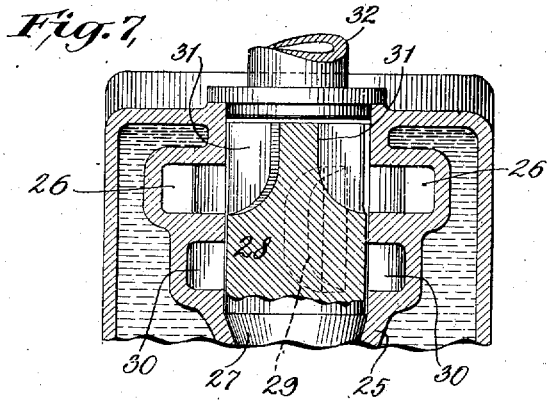

Figure 2 a section of the rotary valve member crosswise of its casing;

Figure 3 a transverse cross-section through the ports in Figs. 1 and 2;

Figure 4 a detail of the floating drive;

Figure 5 is an axial section of a modified form of valve serving both inlet and exhaust ports;

Figure 6 a cross-section of Fig. 5 at the level of the engine port;

Figure 7 a section on line VII—VII of Fig. 6;

Figure 8 a cross-section of Fig. 5, through the lower manifold connection;

Figure 9 is an axial section, with valve member in elevation, of a further form serving both inlet and exhaust;

Figure 10 a section thereof on line X—X of Fig. 9;

Figure 11 a section on line XI—XI of Fig. 10;

Figure 12 is an axial section of a further modification, and

Figure 13 a still further modification.

In the several figures of the drawings, the new valve is shown applied to a conventional T or L-head engine cylinder, but is not limited to that or any form of engine, and the casing of the valve is also shown as part of the cylinder casting, and with its central axis vertical, which are also matters of optional design. The upper ported part of the valve casing as shown in Figs. 1–3, is its port-sealing part and is marked 1, and its lower end is its seating part, by which it supports and alines the port-sealing part, and is marked 2. The ported part 1 is a cylindrical walled cavity provided with port openings 3 and 4 on opposite sides of its central axis which are connected with an opening into the combustion space of the engine, the port 3 being directly in line with such opening, and the port 4 being connected therewith through two semi-circular passages 5 formed in the casing. The lower or seating part 2 of the casing is formed by an axially tapered wall of circular cross-section which is surrounded by the cooling medium represented in the drawing as a conventional water-jacket space 6, which may surround the upper part of the casing to remove the heat from the latter also, and inasmuch as the two walls $5^a$ which form the passages 5 are subject to the hot gases on both sides they are made relatively thick and curved at top and base as indicated, so that the heat therein may freely escape to the metal walls above and below them which are in contact with the cooling medium as just stated. The chamber of the valve casing opens upwardly into the manifold 7 which is disposed above the valve in the present case, a location determined solely by the arrangement of ports in the particular valve, taken for illustration, as will presently be apparent.

The active or rotary member of the valve is inserted endwise in the casing through the manifold opening in this form, and is constituted by a lower seating part 8, herein referred to as its journal and an upper, ported, and port-sealing part 9. The seating or journal part is axially tapered to seat upon the axially tapered seat 2 of the casing, forming a self-alining bearing therewith which holds the port-sealing part 9 concentrically to the corresponding part 1 of the casing and in position where its port passages may alternately register with the fixed ports 3 and 4 as the valve-member rotates and thereby open and close the passage from the engine cylinder to the manifold. Both ported parts are circular in cross-section and preferably cylindrical and their proximate parallel surfaces are separated by a fine crevice devoid of oil or lubricant and so narrow as to constitute in the dry state an efficient seal for the valve whenever the ports are not in register. For this purpose it is practicable to make the ported part 9 about .004 inch less in diameter than the internal diameter of the casing and it is preferable to roughen both opposing surfaces so that a hard deposit of carbon will form and adhere thereto, still further narrowing the crevice. The roughened surface of the valve member in Fig. 2 is preferably formed by cutting a fine, slow-pitch screw thread in its surface, but the same result can also be obtained by knurling it, or the very fine non-leaking crevice can be obtained in the first instance by accurate grinding. The extent to which a crevice of originally say .002 inch thickness is narrowed by the deposit of carbon on the roughened or threaded surface or surfaces, is difficult to state, as it is not easily measured, but the surfaces are thus brought very close together and may be regarded as in imperfect or pressureless contact, in which relation no friction or frictional heat is developed by their relative movement even at very high speeds. This special relation of the port-sealing surfaces can be preserved in actual service only by an adequately rigid and accurately supporting seat for the rotary member, and such a seat is provided by the axially tapered surfaces of the parts 2 and 8. These parts are accurately fitted to each other and the valve is so related to the engine that such seating pressure as is exerted thereon is principally and preferably exactly in the direction of its axis, so that wear is thus symmetrical and any displacement of the rotary member occurring from wear can take place only in that direction, that is to say, in the direction of the parallel sealing surfaces of the valve, such displacement being thus without effect upon the ability of the valve to constitute an effective closure to the combustion space. This desirable pressure relation is accomplished in the form of Figs. 1 to 3, by exposing the valve member to the engine pressure at the diametrically related ports 3 and 4, so that it is thus balanced so far as lateral pressures are concerned. The seating thrust is thereby exerted solely by the weight of the valve member itself or by such weight plus the pull of a light seating spring presently referred to, or in cases where the valve is not desired to occupy a vertical position, it may be seated by the spring alone or by equivalent moderate seating pressure from any source.

Inasmuch as the valve seating pressure has no function in sealing the valve against escape of interior gas pressure, as in other valves, it is not necessary for the seating spring to exert greater pressure than necessary to retain the valve in position under such counter-force as might be represented by the suction of the engine or a possible thrust of the drive gear, and it is therefore entirely practicable and preferable to design the valve, according to methods well known to the art, so that the engine pressures, even though balanced, be not fully exerted against the lubricated seat.

The seating surfaces are lubricated by oil from the oiling pipe 10 connected to a drip-cup, not shown, and the oil film between constitutes an effective heat-conducting junction, as already explained. The dry running upper part 9 of the valve member has no path for discharging the heat it receives from the flame, to the adjacent water-jacketed wall 1 of the casing, on account of the intervening film of gas, and it would therefore attain an excessive and serious temperature if it were not that such heat can escape very readily, through its base 8, as above explained. This base is therefore, and preferably, made of solid metal, being structurally integral with the upper part and it is also relatively large, so that it not only thereby contributes to the rigidity with which the member is held in alinement but also provides an extended area for oil-film contact with the cooled journal seat 2. The heat in the ported part of the valve member thus finds a flow path of ample metallic cross-section direct to the large area of oil film and through the latter to the water-jacket. In the form of Figs. 1 to 3, the upper ported part is hollowed out to form the port passage, and the ported walls are tapered so as to give a progressively increasing metallic cross-section at all points from the extreme rim to the journal or base 8, thereby providing a uniform temperature gradient from one end of the valve to the other which assures uniform and symmetrical thermal expansion of the valve member and avoids impairment of either the sealing or seating functions which might otherwise result from uneven temperature or localized hot spots.

The symmetrical disposal of the seating surfaces with respect to the axis of rotation and the relatively light seating pressure thereon as already explained conduce toward the maintenance of the oil-film heat-junction when the valve is in action. The oil may also be supplied under pressure to assist further in its maintenance, but this invention prefers to assure the integrity of the oil film by a simple means consisting in taper-curving the said surfaces. This is accomplished by shaping the said surfaces according to the surface of revolution of the mathematical curve known as the equi-tangential tractrix, with the axis of the valve coinciding with the axis of said surface. The drawings are intended to illustrate such a formation. Its adaptability to the purposes in hand is due to the fact that at the lower or narrower part of the seat where the surface velocity is slower, the pressure of the valve member on its seat is greater than that at the larger diameter, where the surface velocity is greater, the pressure is lower, and thereby, as I have ascertained, the effect is to distribute the oil film with such uniformity as positively to prohibit its breaking down so long as enough oil is present to cover the surface. Introduction of oil at the narrower and lower end, as indicated in the drawings, is suitable and a drip feed into the oil supply pipe normally supplies a sufficient quantity of oil, although a forced oil feed may be used as stated, in which case the oil itself might also carry away some of the heat. The thermal expansion of valve members seated upon equi-tangential tractrix seats as above described, does not in any way tend to impair or alter the oil film, nor does such wear as may take place tend to effect any change in alinement, and in any event and because of the effective cooling action above explained the thermal expansion of the said valve is not large, and does not differ materially from that of the casing.

The rotary valve member is preferably driven by a driving connection that imparts no appreciable lateral pressure to it, such as might tend to sidewise wear and lateral displacement or disalinement of the dry running surfaces. A carefully journaled or a relatively slender and hence elastic valve shaft may serve this purpose, but for sure avoidance of disalinement from this cause, the invention prefers the so-called floating drive, of which several forms are available. The one shown in Fig. 1 comprises an intermediate floating disk 11, shown in Fig. 4, provided with opposite slots 12 engaged with downwardly projecting lugs 13 on the collar 14 pinned to the valve stem, and also with another pair of slots 15 disposed at right angles to the slots 12 and engaged by the upward projections 16 on the collar 17 pinned to the valve shaft 18. By such connection the valve shaft 18 can be considerably out of line with the valve axis without imparting lateral stress to the latter, as will be evident. The seating spring above alluded to, is applied to the floating drive, being interposed between the head of the collar 17 and the housing 19 of that mechanism, as shown at 20. The spring, acting through the housing pulls the valve in substantially the direction of its axis. The housing is connected by bayonet slots with the collar 14 so that it is removable.

The valve shaft 18 is shown journaled in the bed structure 21 of the engine and driven by skew gears 22 from the valve shaft 23, the latter being of course understood to be driven by the engine crank-shaft and in proper phase with the valve, so that the engine cylinder is connected with the manifold at appropriate times.

As a further example of the manner of embodiment of the principle of the invention, Figs. 5, 6 and 7 represent a single valve adapted to serve both the inlet and exhaust ports of the engine, a service which can be efficiently accomplished by reason of the moderate temperature at all times maintained in the valve structure, and which is not satisfactorily accomplished by those other proposed forms of rotary valves subject to excessive temperature, because of the excessive warming and expansion of the inflowing charge effected thereby, and uneven temperature in the valve itself. In this form, on the contrary, as also in the double-purpose valves of Figs. 9—11 hereinafter described, it is obvious that the incoming air, while not unduly warmed and expanded, assists in the removal of heat from the dry-running part of the valve by direct contact therewith. In these figures the valve casing is formed of port sealing and seating walls marked 24 and 25, respectively, both of which are water-jacketed as before, and the part 24 is provided with fixed ports 26 connected with the engine cylinder and disposed diametrically opposite to each other so as to balance the pressures on the valve member. The rotary valve member seats by its massive journal portion 27 upon the journal seat 25 and the meeting surfaces are tapered according to the equi-tangential tractrix curve above referred to. The upper port-sealing part of the valve member marked 28 runs dry and in imperfectly contacting relation to the corresponding surface of the casing wall 24 so as to constitute therewith the same efficient port-sealing agent as in the form first described. The port passages in this valve member are cut therein in the form of pockets, two of such pockets being semi-circular as illustrated (in part by dotted lines) at 29 in Fig. 5. These ports simultaneously connect the fixed ports 26 with the wide intake port 30 formed in the casing wall below the plane of the former ports. The two other ports in the part 28 are formed therein between the intake ports 29, as shown at 31, and open upwardly through the top of the valve member where they are in communication with the exhaust manifold 32. When these ports come in register with the fixed ports 26, the ports 29 are faced against the blank wall of the casing, hence closing the intake and comunication is established through the upper ports with the exhaust manifold. The latter is secured to the top of the valve casing, as in the preceding form, and the intake manifold is supposed to be connected to the port 30 at the side of the casing, although this arrangement can obviously be reversed if desired. It will be evident that the valve member 27—28 is perfectly balanced so far as engine pressures are concerned and that the heat received by its port sealing and dry running portion finds ample path for escape to the oil-filmed seat through the relatively thick metal remaining betwen its ports through its thick base. This valve is shown driven by a floating drive on the same principle as already explained, the seating spring 20[a] however being inside the part 18[b] representing the valve-shaft in this form.

Figs. 9, 10 and 11 illustrate a further arrangement of port passages whereby one or both of the engine manifolds may be connected at the side instead of the top of the valve casing. In these figures the principal parts of the casing and valve member will be recognized from the description already given and will be understood to involve the imperfectly-contacting sealing surfaces and the lubricated journal surfaces disposed respectively at opposite ends of the valve structure. The upper part of the valve chamber through which the valve is introduced, is closed by a screw plug and the port passage 33 through the valve member is formed obliquely therein, with its upper end disposed in register with a lateral extension 34 of the combustion space which surrounds the valve member, so that the said port is constantly in communication with the interior pressure. The lower end of the port is adapted to register alternately with the inlet and exhaust casing ports 35 and 36, connecting first the one and then the other of them with the combustion space, according to a desired cycle, as will be evident from the drawings without further explanation. In this form the engine pressure although having access to all sides of the rotary member, does not evenly balance thereon, but by virtue of the size and efficient lubrication of its journal, such lateral pressure as is present entails no appreciable disalinement as the result of long continued wear. It will be noted also that the only lateral pressure against this valve member is exerted on it at the level of the manifold ports and close to the firmly seated oil-filmed surfaces, and also that the metallic cross-section of the valve-base constitutes a liberal path for the flow of heat through said surfaces to the surrounding cooling medium. The valve-member is also roughened or threaded in this form as indicated in Fig. 1.

Fig. 12 illustrates another application of the principle of the invention and in which the valve member is subjected to the full unbalanced pressure of the combustion gases exerted laterally thereon. In this case the tendency to unsymmetrical wear, such as might impair the port-sealing effect, is minimized by making the journal and seat portions of such relatively large proportions with respect to said pressure as to make any ultimate displacement unappreciable and therefore negligible. It will be apparent that the seating parts can be made as large as necessary for this purpose but they need be no larger than will suffice to keep lateral wear within the negligible limit during the normal life of the piston and cylinder and other engine parts, since the valve will have completely fulfilled its functions when the engine as a whole is worn out. In this form the taper of the seating portions is straight or conical, and while this form is not so well adapted to maintain the continuous oil film, as already explained, it is nevertheless capable of providing a requisite rate of heat dissipation by reason of its large size and the extended area of externally-cooled surface. It will be understood, therefore, that while the pressure balance and the curved taper are preferred factors in obtaining true wear, the valve may be made substantially true wearing and hence of constant efficiency, at least for the life of the engine, without them, and of course approximations to constant efficiency are within this invention if obtained by substantially the means hereinabove described.

It will also be noted that whereas each of the forms of valve above described is subject to the engine pressures on its side portions, they may nevertheless receive such pressure in the reverse direction as would be the case, for instance, if the passage 37 in Fig. 12, were connected to the combustion chamber and the passage 38 to the manifold. In such case the seating surfaces would be called upon to withstand the full engine pressure and should be constructed with that requirement in view. It is preferable in this case to utilize the tractrix curve above referred to as the means of preserving the oil film contact under such conditions, as illustrated for example in Fig. 13, wherein the pressure of the combustion gases is normally in communication, through passage 40, with the interior of the valve member, and the manifold 39 is at the side of the valve casing. In this arrangement and because the outlet port is in the side wall of the casing, the valve member 41 has a slight tendency toward unsymmetrical pressure upon its seat, and this tendency can be offset and balanced, if desired, in an effective manner by forming the top of the valve member with an extension or lip on its ported side, having a projected area equivalent to that of the port, whereby the pressure effort thereon is exerted in a direction substantially counter to the tendency toward disalinement and in the same value, the result being a practically symmetrical, or axial pressure exerted upon the seat and consequent uniform wear.

In the forms above described some variation appears in the shape of the tractrix curve, but it will of course be appreciated that the appearance of the curvature depends upon the length taken for the tangent and that in any case the degree of curvature is greater at the points of larger radius than at the smaller. In all said forms the principle of the invention is present in the division of the sealing and seating functions, the absence of need of lubrication for the former and the rapid heat-transferring and symmetrical wearing characteristics of the latter, which combine to produce a valve structure capable of indefinite service at maximum efficiency and particularly suitable for controlling the high pressures and temperatures in Diesel engines and in large sizes of such engines, and equally serviceable in high and low speed engines. It will be apparent without explanation that the particular design of such valve-structures is subject to wide variation as to location on the engine, the number and size or arrangement of the ports or cylinders controlled, the method of cooling the seating surface and of oiling them and also the rotary drive gearing. These matters will naturally be determined by the maker according to the conditions of use and the results desired.

I claim:—

1. An internal combustion engine valve comprising a rotary valve-member composed of functionally independent but structurally integral parts or portions, one a ported part and the other a journal part, in combination with a valve casing for said member composed of a ported part having its wall surface parallel with, and in imperfectly contacting relation to the corresponding ported surface of said rotary member whereby said opposing surfaces may function as the sealing means of the valve without lubrication, and a part constituting a lubricated seat supporting said valve-member journal maintaining the said imperfectly contacting surfaces in concentric alinement with each other notwithstanding wear, and a water-jacket surrounding said casing journal seat capable of rapidly abstracting heat from the journal therein and operating to maintain a moderate temperature throughout the whole of said rotary valve member.

2. An internal combustion engine valve comprising a rotary valve-member composed of functionally independent but structurally integral parts, one a ported part and the other a tapered journal part, in combination with a valve casing for said member composed of a ported part having its wall surface concentric with, and in imperfectly contacting relation to, the corresponding ported surface of said valve member whereby said opposing surfaces may function as the sealing means of the valve without lubrication, and a part constituting a lubricated tapered seat for said tapered valve-member journal, and having an extended area in heat-transferring contact therewith whereby a moderate temperature is maintained in said valve member by transfer of heat therefrom through said seat.

3. A rotary valve for internal combustion engines comprising a rotary valve-member having a tapered journal part and a casing therefor providing the seat for such journal part, the co-acting ported surfaces of said member and casing being disposed in dry-running and substantially pressureless contact, and the seating surfaces thereof being in oil film contact, and a heat-dissipating means immediately around said lubricated seat.

4. A rotary valve for internal combustion engines comprising a rotary valve-member and a casing therefor, the ported wall surfaces of said member and casing being dry-running parts operating as the means for sealing the valve and disposed at one end of the valve structure, and the seating portions of said valve-member and casing being disposed at the other end of the valve structure and constituted by lubricated axially tapered seating surfaces on said member and casing respectively, subject only to inappreciable lateral displacement from wear and affording an ample path for escape of heat from the dry-running ported part of said valve member, through the seat surface of the casing, and a heat-dissipating medium surrounding the seat of the casing.

5. In an internal combustion engine, a rotary valve comprising a casing and a rotary valve member provided with opposing dry-running port sealing surfaces and axially tapered lubricated seating surfaces providing a heat escape-path capable of keeping the ported part of the valve member at a low temperature, and the said valve member having increasing cross-sectional solid metallic area from the end of its ported parts to its seated part, and means outside the casing for absorbing the transmitted heat.

6. In an internal combustion engine, a rotary valve comprising a casing connected with the engine cylinder, a rotary valve member seated endwise in said casing and subjected to the engine pressure in balanced relation said casing and member being provided with opposing imperfectly contacting, ported surfaces adapted to seal the valve without lubrication and with axially tapered seating surfaces in lubricated and heat-transferring contact with each other, and a heat-abstracting medium adjacent said seating surfaces, said seating surfaces and medium providing an escape path for heat received by said valve member adequate to maintain a safe temperature and low temperature gradient therein.

7. A rotary valve for internal combustion engines comprising a casing and valve-member provided respectively with opposing imperfectly contacting ported surfaces adapted for sealing the valve without lubrication and with lubricated seating surfaces, the latter being axially taper-curved substantially according to the curvature of the equi-tangential tractrix and thereby adapted to maintain heat-transferring contact between said valve and seat.

8. In an internal combustion engine, a rotary valve comprising a casing and a solid metal, rotary, valve member, the proximate faces of said member and casing being cylindrical in the ported region of the valve and axially taper-curved in the region of the valve constituting the seat of the member upon the casing, the said cylindrical surfaces being in dry imperfect contact and provided with ports adapted to register by the rotation of said member, and the said taper-curved portions having greater curvature at the larger diameter than at the smaller diameter and providing large cross-sectional area for escape of heat from said cylindrical part.

9. A rotary valve for internal combustion engines comprising a metallic rotary valve member and a casing therefor, said member and casing being provided with opposing imperfectly contacting ported surfaces adapted to seal the valve without lubrication, one of which is superficially roughened and adapted to collect a carbon deposit, and a journal and journal seat on said member and casing respectively adapted to preserve a predetermined relation of said ported surfaces notwithstanding wear.

10. A rotary valve for internal combustion engines comprising a rotary valve-member and casing, the proximate ported faces thereof being in substantially pressureless port-sealing relation to each other, an axially tapered journal on the valve-member, a correspondingly tapered journal seat on the casing and a floating drive for said member adapted to rotate the same without imparting side thrust thereto.

11. A rotary valve for internal combustion engines comprising a rotary valve-member having a ported part and a tapered and relatively massive journal part, in combination with a valve casing having a ported part and a tapered and lubricated seat adapted to support and aline the journal part and providing therewith a heat transfer path to the exterior of said seat, the ported surfaces of said valve and casing being in imperfectly contacting relation and operating as port-sealing means without lubrication.

12. A rotary valve for internal combustion engines comprising a rotary valve member and a valve casing therefor provided with opposing imperfectly contacting and dry-running ported surfaces and with tapered seating surfaces in lubricated and heat-transferring contact with each other, the ports of said casing being diametrically disposed with reference to said member and a flexible means for rotating said member.

13. A rotary valve for internal combustion engines comprising a metallic rotary valve member and a casing therefor, said member and casing being provided with opposing imperfectly contacting ported surfaces having faces of hard carbon deposited thereon from the engine gases, and a journal and journal seat on said member and casing respectively adapted to preserve said imperfectly contacting relation of said ported surfaces notwithstanding wear, and forming an escape for heat from said surfaces.

14. A rotary valve for internal combustion engines, comprising a casing and rotary valve member provided respectively with opposing ported and port-sealing walls and with lubricated seating surfaces separate from said walls and axially taper-curved substantially according to the curvature of the equi-tangential tractrix, and means for supplying oil to said seating surfaces.

15. A rotary valve for combustion engines comprising a casing and a single rotary valve member therein, said casing and member being provided with an inlet passage for admitting air to the cylinder and an exhaust passage for the escape of combustion products therefrom both controlled by said single rotary valve member which has a part by which it is journaled and another part by which it cooperates with said casing to close said inlet and exhaust passages, said passage closing part and said valve casing being respectively provided with concentric, parallel, ported surfaces closely opposed in imperfect or pressureless contact with each other and thereby co-acting to seal said passages without the presence of a liquid film between them, and self-centering and endwise-seating journal means for the journal part of said member adapted to support the passage closing part in the aforesaid relationship and serving to permit wear displacement of the valve member only in an axial direction.

In testimony whereof, I have signed this specification.

JOHN GOOD.